United States Patent
Lindholm

(10) Patent No.: US 8,636,299 B2
(45) Date of Patent: Jan. 28, 2014

(54) MODULAR BALLAST SYSTEM

(75) Inventor: Tim J. Lindholm, Roseville, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 89 days.

(21) Appl. No.: 13/336,115

(22) Filed: Dec. 23, 2011

(65) Prior Publication Data

US 2013/0161928 A1    Jun. 27, 2013

(51) Int. Cl.
*B60R 21/16*  (2006.01)
*E01C 19/26*  (2006.01)

(52) U.S. Cl.
USPC .......................... 280/727; 404/130; 172/611

(58) Field of Classification Search
USPC .......................... 280/727; 404/130; 172/611
See application file for complete search history.

(56) References Cited

U.S. PATENT DOCUMENTS

| | | | |
|---|---|---|---|
| 3,176,866 A * | 4/1965 | Meister, Jr. .................. | 414/607 |
| 3,636,835 A | 1/1972 | Reisser | |
| 3,900,272 A | 8/1975 | Domenighetti | |
| 4,559,891 A * | 12/1985 | Shorter, Jr. .................... | 114/263 |
| 4,854,772 A | 8/1989 | Sinkkonen | |
| 4,887,654 A * | 12/1989 | Rytand .......................... | 114/267 |
| 5,199,371 A * | 4/1993 | Meriwether .................. | 114/267 |
| 5,993,110 A | 11/1999 | Bueno | |
| 6,149,373 A * | 11/2000 | Gesuale ........................ | 414/607 |
| 6,205,945 B1 * | 3/2001 | Passen et al. .................. | 114/267 |
| 7,152,883 B2 * | 12/2006 | Niemela ........................ | 280/759 |
| 7,497,641 B1 | 3/2009 | Frelich | |
| 8,166,901 B2 * | 5/2012 | Gerst et al. .................... | 114/263 |
| 8,322,945 B2 * | 12/2012 | Groeneweg et al. .............. | 404/6 |
| 2008/0309059 A1 | 12/2008 | Clements | |

FOREIGN PATENT DOCUMENTS

| | | |
|---|---|---|
| DE | 29620847 | 3/1997 |
| EP | 0845557 | 6/1998 |

* cited by examiner

*Primary Examiner* — Toan To
(74) *Attorney, Agent, or Firm* — Joseph E. Reed

(57) ABSTRACT

A ballast system provided herein includes: a ballast including: a first recessed bottom portion; a second recessed bottom portion; a sump portion between the first and second portion, the sump portion configured to extend downward past the first and second recessed bottom portions; and a machine comprising a ballast holding area, the ballast holding area including: a channel configured to receive a ballast; a first cantilevered lip; and a second cantilevered lip spaced apart from the first cantilevered lip, the first and second cantilevered lips configured to hold the ballast in place there between.

16 Claims, 2 Drawing Sheets

MODULAR BALLAST SYSTEM

TECHNICAL FIELD

Embodiments of the present disclosure pertain to a ballast.

BACKGROUND

A ballast is an additional weight, which can be added to a machine to alter the weight and weight displacement of the machine. Compactors are one example of a machine which may use a ballast in their operation. For example, compactors are used for various compaction tasks such as on highways, city streets, county roads, and well-graded gravel jobs. These differing jobs and surfaces often require differing compaction levels.

One type of compactor known as a pneumatic compactor utilizes a combination of tire pressure and machine weight to help achieve a desired compaction level. In order to better control the weight of a conventional pneumatic compactor, a ballast may be added or removed to add or subtract weight from the machine in order to optimize the compaction performance for various applications.

Steel plates are often used as conventional ballasts for pneumatic compactors. These plates vary in weight, but are typically flat on the bottom and require that an operator use a special loading stand, unique fixture, or a crane to load and unload the ballasts.

For example, U.S. Pat. No. 3,636,835 (the '835 patent) issued to Reisser on Jan. 25, 1972, discloses a compaction machine that uses a ballast to alter the weight of the machine.

SUMMARY

According to aspects disclosed herein, a ballast system is provided to allow easier weight adjustments for a machine.

According to an aspect of an embodiment herein, a ballast system is disclosed. The ballast system includes: a ballast including: a longitudinal axis; two longitudinally extending, parallel, and downwardly facing surfaces; and a projection between the two downwardly facing surfaces that extends below the downwardly facing surfaces; and a machine including a ballast holding area, the ballast holding area including: a channel configured to receive the ballast; a first support surface configured to support one of the two downwardly facing surfaces; and a second support surface spaced apart from the first support surface, the second support surface configured to support a second of the two downwardly facing surfaces, the first support surface and the second support surface configured to hold the ballast there between.

According to an aspect of an embodiment herein, the ballast includes: a longitudinal axis; two longitudinally extending, parallel, and downwardly facing surfaces; and a projection between the two downwardly facing surfaces that extends below the downwardly facing surfaces.

According to an aspect of an embodiment herein, the machine includes a ballast holding area, the ballast holding area including: a channel configured to receive a ballast; a first cantilevered lip; a second cantilevered lip spaced apart from the first cantilevered lip, the first and second cantilevered lips configured to hold the ballast in place there between.

A machine including a ballast holding area, the ballast holding area including: a channel configured to receive a ballast; a first support surface configured to support one of the two downwardly facing surfaces; and a second support surface spaced apart from the first support surface, the second support surface configured to support a second of the two downwardly facing surfaces, the first support surface and the second support surface configured to hold the ballast there between. The machine may be a pneumatic compactor.

DETAILED DESCRIPTION

Exemplary embodiments of the present invention are presented herein with reference to the accompanying drawings. Herein, like numerals designate like parts throughout.

Figure 1:
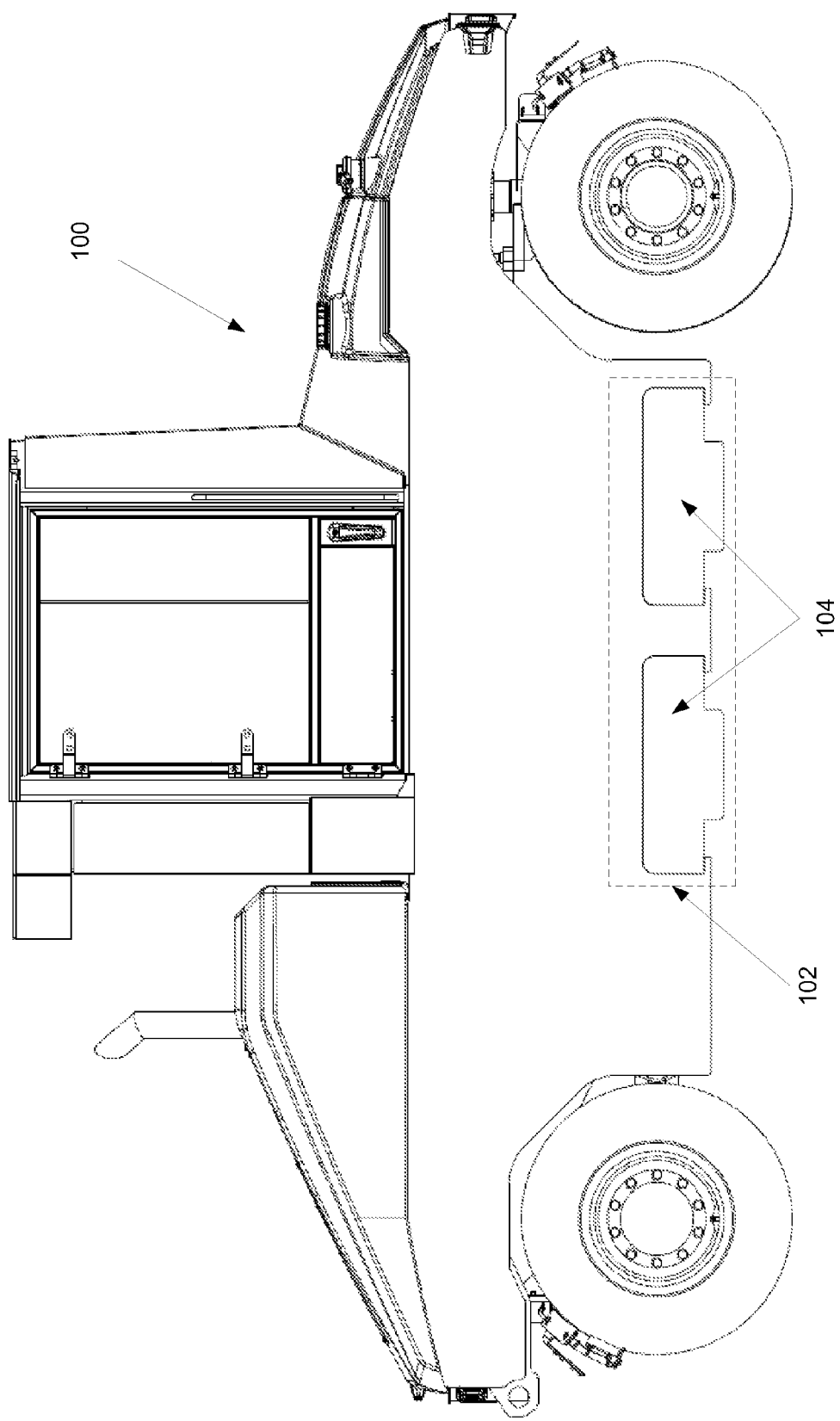
FIG. 1 illustrates an exemplary machine according to an embodiment described herein.
Figure 2:
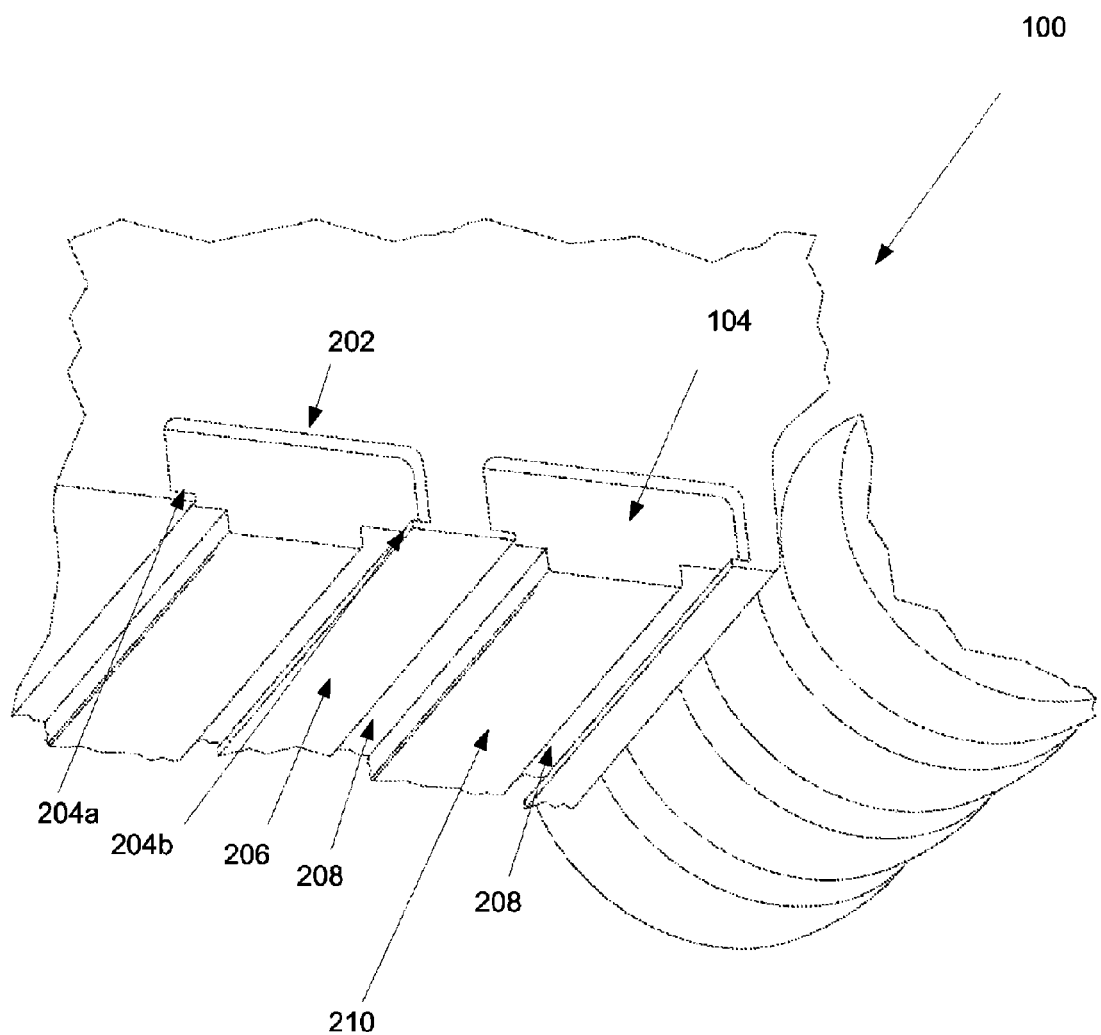
FIG. 2 is an exploded view of ballast system as illustrated in FIG. 1.

FIG. 1 illustrates an exemplary machine 100 according to an embodiment described herein. FIG. 2 is an exploded view of the ballast system as illustrated in FIG. 1.

According to FIGS. 1 and 2, a ballast system includes a ballast 104, and a machine 100 (also referred to as a vehicle 100) including a ballast holding area 102.

According to an embodiment herein, the machine 100 may be a compactor 100, but is not limited thereto. For example, the machine 100 may be a pneumatic compactor 100.

The ballast 104 includes a longitudinal axis, two longitudinally extending, parallel, and downwardly facing surfaces 208 (e.g., recessed bottom portions 208), and a projection that extends below the downwardly facing surfaces 210 (e.g., a sump area 210).

The sump portion 210 is configured to extend downward past the recessed bottom portions 208 to create a gap or adequate amount of ground clearance between the recessed bottom portions 208 and a resting surface (e.g., the ground), such that when a ballast 104 is laying on the ground, a conventional skid-steer with a fork attachment or an actual fork lift could lift under the ballast via the recessed portions 208.

The sump portion 210 may be an integrally formed portion of the ballast or may be affixed thereto. The affixed sump portion 210 may be removably affixed (e.g., bolted on) or may be permanently affixed (e.g., welded on).

The ballast holding area 102 of the machine 100 includes a channel 202 configured to receive a ballast 104, and two supporting surfaces 204 (e.g., cantilevered edges 204 or cantilevered lips 204) spaced apart from each other. The cantilevered lips 204 are configured to hold the ballast 104 in place there between. The cantilevered lips 204 extend horizontally to support the ballast 104 and are configured to be spaced far enough apart from each other to allow clearance for the sump portion 210 of the ballast and for forks when loading and unloading. The ballast holding area may extend across the entire width of the machine 100 or a portion thereof. Additionally, the cantilevered lips may extend the entire length of the ballast area or a portion thereof.

A dual support surface 206 (e.g., a lip platform 206) may join a cantilevered lip 204 from a first ballast holding area 102, to another cantilevered lip 204 of a second ballast holding area 102.

As shown in FIGS. 1 and 2, the ballast holding area 102 of the machine 100, may include multiple ballast holding areas 102 (herein the ballast holding areas 102 may be referred to collectively as a ballast holding area 102.) FIGS. 1 and 2 depict two ballast holding areas 102 (denoted collectively and individually), but the disclosures herein are not limited to only two ballast areas 102, and may include embodiments with only one ballast area or embodiments with three or more ballast areas.

Each ballast holding area 102 is configured to hold and support a ballast 104. Additionally, each ballast 104 may be multiple ballasts 104 (e.g., segmented ballasts 104).

The ballasts 104 may be designed at any desired weight. However, according to an embodiment herein, each ballast 104 (or ballast segment 104) may be sized to weigh just under one (1) ton (e.g., 2000 pounds). Keeping the ballasts 104 under 2000 pounds provides that the ballasts 104 may be easily and quickly loaded by a standard fork-lift or skid-steer with a fork attachment without the need for special equipment.

Accordingly, the cantilevered lips 204 are configured to support the weight of each ballast 104 or each series of ballast segments 104 received. According to an embodiment disclosed herein, each ballast 104 may include four separate ballast segments 104 each weighing up to 2000 pounds. Therefore, each pair of cantilevered lips 204 may be configured to support 8000 pounds. However, the disclosures herein are not limited thereto.

The first of the pair of cantilevered lips 204 are configured to support the first recessed bottom portions 208, and the sump portion 210 is configured to extend downward past the cantilevered lips 204. This downward extension is designed to facilitate lifting of the ballast 104.

According to an embodiment herein, the ballast 104 is configured with a generally rectangle shape and sump area 210 in order to maximize the weight of the blocks within the space constraints of the machine 100.

INDUSTRIAL APPLICABILITY

The disclosed ballast system may be implemented in various machines. According to an embodiment disclosed herein, a ballast system may be implemented in a pneumatic compactor 100. A ballast system comprises shaped ballasts 104 and ballast holding areas 102 (e.g., ballast recesses 102 or pockets 102) within the body of the compactor 100. The shape of the disclosed ballast(s) 104 includes two longitudinally extending, parallel, and downwardly facing surfaces 204 and a projection 210 (e.g., a sump area 210) between the two downwardly facing surfaces 204 that extends below the downwardly facing surfaces 204.

The ballasts 104 are configured to rest on the ground and still allow a skid steer or forklift to lift and maneuver them. Thus, the projection 210 is configured to extend a sufficient distance below the downwardly facing surfaces 204 to allow a skid steer or forklift to lift and maneuver them.

The body of the pneumatic compactor 100 contains specially shaped ballast recesses 102 with cantilevered lips 204 to support and hold the ballasts 104 in place. The ballast holding area 102 includes a channel 202 configured to receive a ballast 104; a first support surface 206a configured to support one of the two downwardly facing surfaces 208 of the ballast 104; and a second support surface 204b spaced apart from the first support surface 204a, the second support surface 204b configured to support a second of the two downwardly facing surfaces 208, the first support surface 204a and the second support surface 204b configured to hold the ballast there between. In this manner, a skid steer or forklift may lift the ballast 104 up off the ground and then load the ballast 104 onto the compactor 100, without the need for an additional stand to hold the ballast 104.

Although certain embodiments have been illustrated and described herein for purposes of description, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present invention may be implemented in a very wide variety of ways. This application is intended to cover any adaptations or variations of the embodiments discussed herein. Therefore, it is intended that embodiments in accordance with the present invention be limited only by the claims and the equivalents thereof.

What is claimed is:

1. A ballast system comprising:
    a ballast comprising:
        a longitudinal axis;
        two longitudinally extending, parallel, and downwardly facing surfaces; and
        a projection between the two downwardly facing surfaces that extends below the downwardly facing surfaces; and
    a machine comprising a ballast holding area, the ballast holding area comprising:
        a channel configured to receive the ballast;
        a first support surface configured to support one of the two downwardly facing surfaces; and
        a second support surface spaced apart from the first support surface, the second support surface configured to support a second of the two downwardly facing surfaces, the first support surface and the second support surface configured to hold the ballast there between.

2. The ballast system of claim 1, wherein the machine is a compactor.

3. The ballast system of claim 1, wherein the first support surface is a first cantilevered edge and the second support surface is a second cantilevered edge.

4. The ballast system of claim 1, wherein the projection is an integrally formed portion of the ballast.

5. The ballast system of claim 1, wherein the projection is configured to be removably affixed to the ballast.

6. The ballast system of claim 1, wherein the projection is configured to extend downward past the first support surface and the second support surface.

7. The ballast system of claim 6, wherein the ballast comprises a plurality of ballasts, wherein each ballast is configured to fit within the ballast holding area.

8. The ballast system of claim 6, wherein each of the plurality of ballasts weighs up to 2000 pounds.

9. The ballast system of claim 1, wherein the ballast area comprises a plurality of ballast areas.

10. The ballast system of claim 1, wherein the machine is a pneumatic compactor, the ballast area comprises two ballast areas, the ballast comprises eight ballasts, and each of the two ballast areas are configured to hold four of the eight ballasts.

11. A ballast system of claim 7, wherein each of the eight ballasts weighs up to 2000 pounds.

12. A machine comprising a ballast holding area, the ballast holding area comprising:
    a channel configured to receive a ballast;
    a first support surface configured to support a first downwardly facing surface; and
    a second support surface spaced apart from the first support surface, the second support surface configured to support a second downwardly facing surface, the first support surface and the second support surface configured to hold the ballast there between.

13. The machine of claim 12, wherein the ballast holding area comprises a plurality of ballast holding areas.

14. The machine of claim 12, further comprising a second ballast holding area, and wherein each ballast holding area is configured to support a respective ballast weighing up to 8000 pounds.

15. The machine of claim 12, wherein the machine is a compactor.

16. The machine of claim 12, wherein the machine is a pneumatic compactor.

* * * * *